United States Patent
Shinkai

(10) Patent No.: US 6,633,904 B1
(45) Date of Patent: Oct. 14, 2003

(54) FAST DATA EXCHANGE SYSTEM BETWEEN DIFFERENT TYPE COMPUTER AND MEDIUM STORING PROGRAM OF EXTENT INFORMATION AND TRANSFORMATION

(75) Inventor: Yoshitake Shinkai, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 302 days.

(21) Appl. No.: 09/612,972

(22) Filed: Jul. 10, 2000

(30) Foreign Application Priority Data

Sep. 16, 1999 (JP) .......................................... 11-261729

(51) Int. Cl.[7] .......................................... G06F 15/167
(52) U.S. Cl. ...................... 709/213; 709/217; 709/238; 709/246; 707/200; 707/201
(58) Field of Search ................................. 709/213, 214, 709/245, 246; 707/200, 201

(56) References Cited

U.S. PATENT DOCUMENTS 5,471,606 A * 11/1995 Huang et al. ............ 369/275.1
5,640,592 A * 6/1997 Rao ............................ 710/20
5,842,198 A * 11/1998 Suzuki et al. ................. 707/2
5,911,776 A * 6/1999 Guck ...................... 707/104.1
5,987,477 A * 11/1999 Schmuck et al. ............ 707/10
6,393,442 B1 * 5/2002 Cromarty et al. ........ 707/501.1

* cited by examiner

*Primary Examiner*—David Wiley
*Assistant Examiner*—Phuoc Nguyen
(74) *Attorney, Agent, or Firm*—Staas & Halsey LLP

(57) ABSTRACT

Fast exchanging and sharing a file between plural computers operating by different type operating systems (OS) are capable, even if disk space allocation system is unknown for OS.

Extent information locating places of files in a disk drive is extracted independent of file systems (which are programs managing files), the extent information is transformed the device driver for the access request to a file. Accessing to a disk drive is implemented by an extent information extracting·transforming interface program with an extent information extracting·transforming program acting as a device driver.

8 Claims, 13 Drawing Sheets

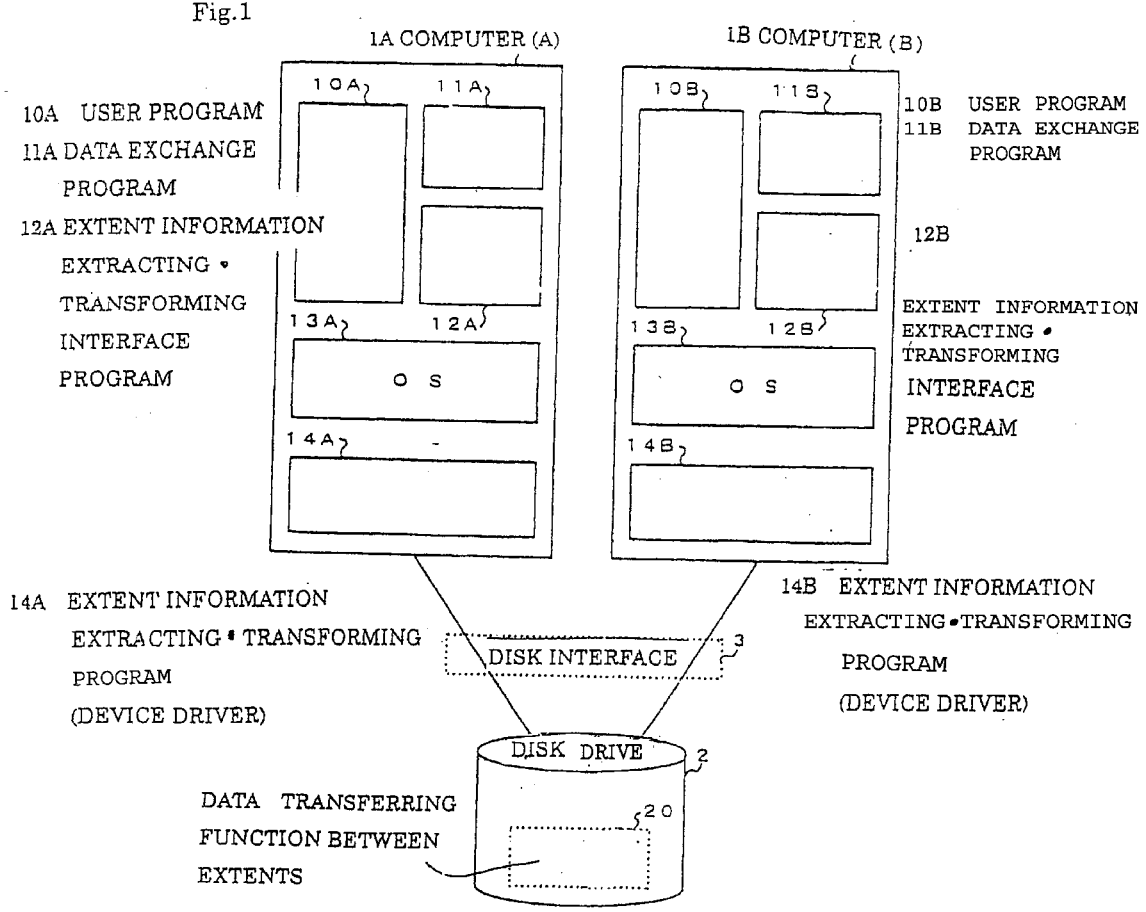

Fig.2

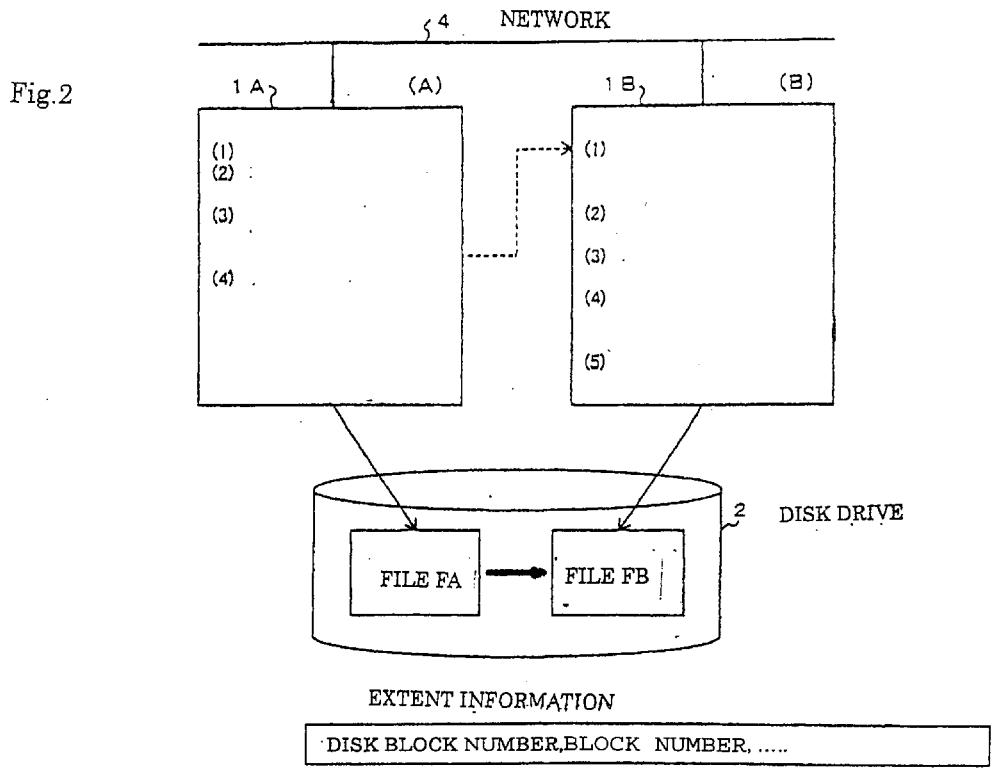

1A COMPUTER (A)

(1) OPEN FILE FA
(2) GAIN EXTENT INFORMATION EA OF FILE FA
(3) SEND INFORMATION EA
(4) WAIT FOR RESPONSE FROM COMPUTER 1A
(5) CLOSE FILE FA

1B COMPUTER (B)

(1) RECEIVE EXTENT INFORMATION EA, FILE NAME AND FILE SIZE FROM COMPUTER 1A
(2) MAKE FB AND OPEN FILE
(3) GAIN EXTENT INFORMATION EB
(4) REFERENCE EXTENT INFORMATION EB, AND COPY DATA
(5) END COPY OF DATA, CLOSE FILE FB
(6) SEND RESPONSE TO COMPUTER 1A

Fig.4

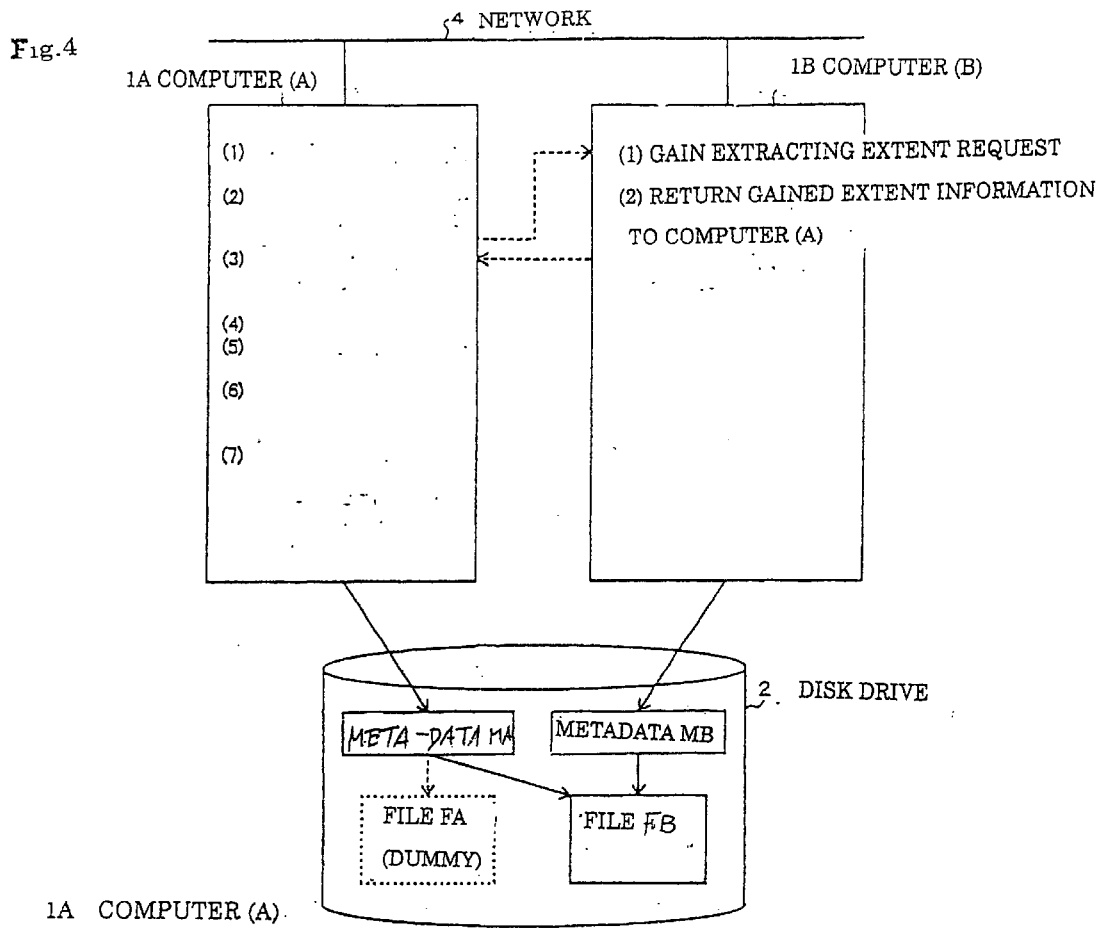

1A COMPUTER (A)
(1) RECEIVE SHARING REQUEST OF FILE FB
(2) REQUEST EXTRACTED EXTENT OF FILE FB TO COMPUTER (B)
(3) RECEIVE EXTRACTED EXTENT INFORMATION EB AND FILE SIZE
(4) MAKE FILE FA
(5) GAIN EXTENT INFORMATION EA
(6) MAKE TRANSFORMING INFORMATION OF EXTENT EA AND EXTENT INFORMATION EB
(7) RETURN RESPONSE TO USER

1B COMPUTER (B)
(1) GAIN EXTRACTING EXTENT REQUEST
(2) RETURN GAINED EXTENT INFORMATION TO COMPUTER (A)

FIG. 6

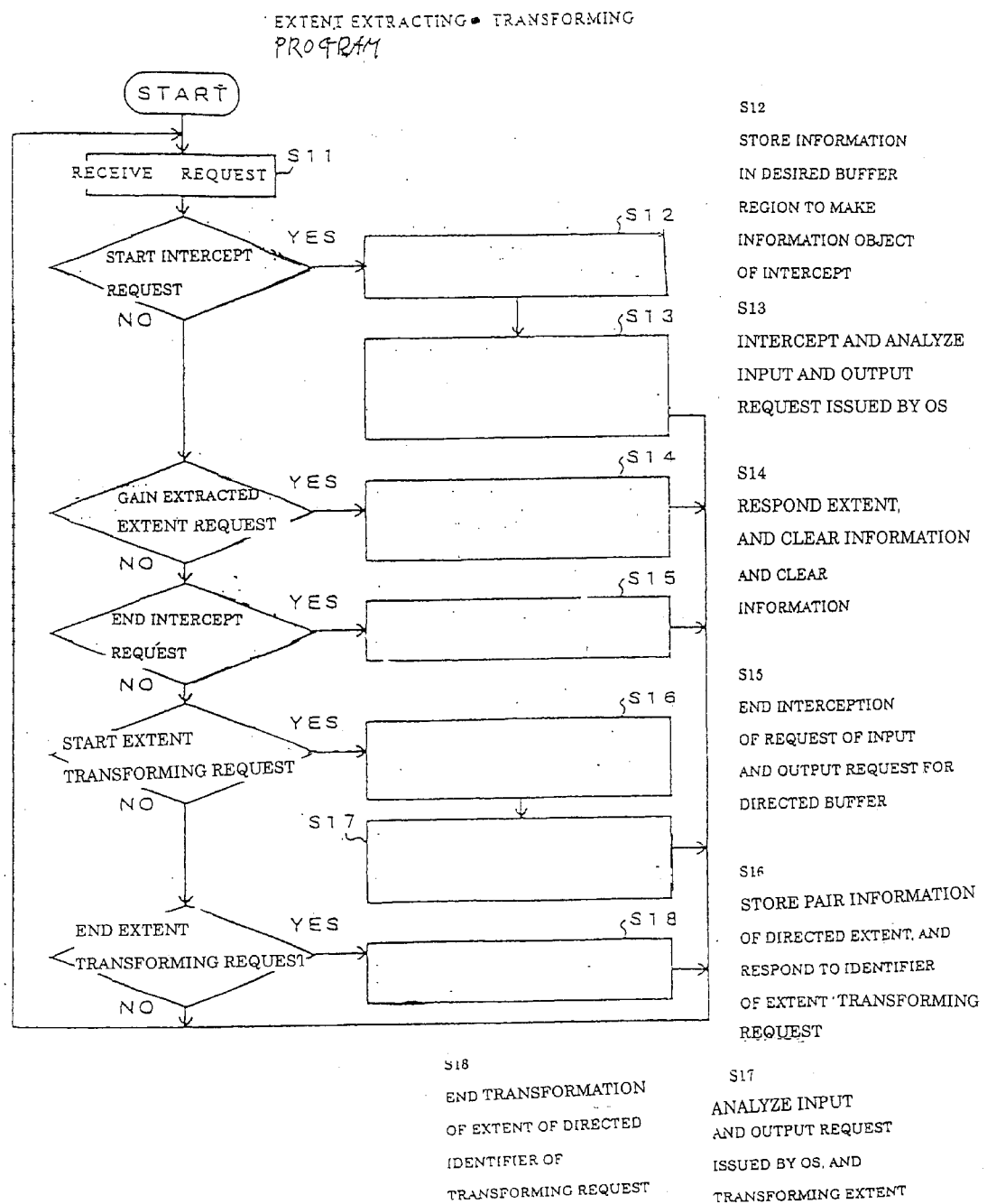

EXTENT EXTRACTING • TRANSFORMING PROGRAM

S12
STORE INFORMATION
IN DESIRED BUFFER
REGION TO MAKE
INFORMATION OBJECT
OF INTERCEPT

S13
INTERCEPT AND ANALYZE
INPUT AND OUTPUT
REQUEST ISSUED BY OS

S14
RESPOND EXTENT,
AND CLEAR INFORMATION
AND CLEAR
INFORMATION

S15
END INTERCEPTION
OF REQUEST OF INPUT
AND OUTPUT REQUEST FOR
DIRECTED BUFFER

S16
STORE PAIR INFORMATION
OF DIRECTED EXTENT, AND
RESPOND TO IDENTIFIER
OF EXTENT TRANSFORMING
REQUEST

S17
ANALYZE INPUT
AND OUTPUT REQUEST
ISSUED BY OS, AND
TRANSFORMING EXTENT

S18
END TRANSFORMATION
OF EXTENT OF DIRECTED
IDENTIFIER OF
TRANSFORMING REQUEST

FIG.7

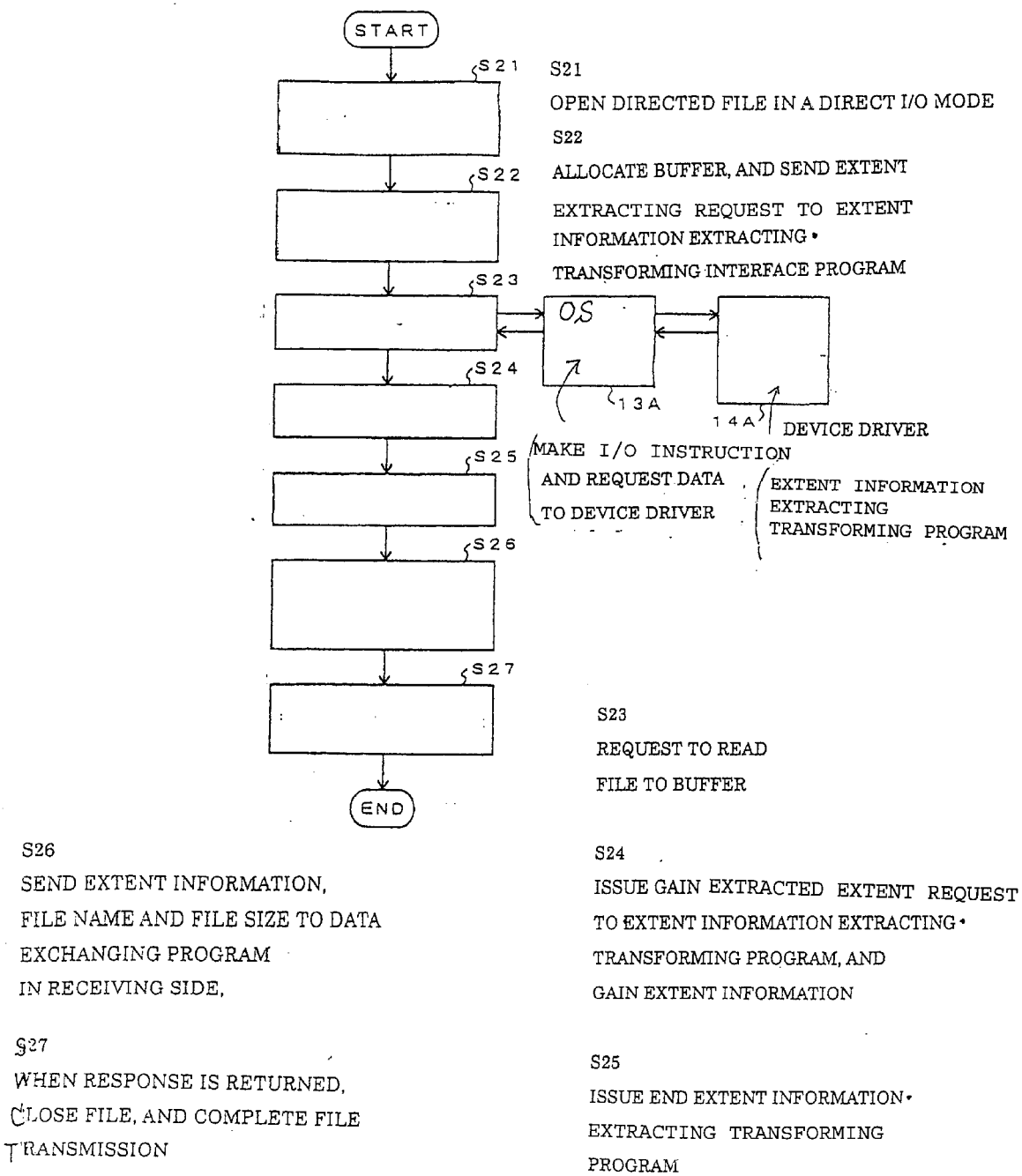

S21
OPEN DIRECTED FILE IN A DIRECT I/O MODE

S22
ALLOCATE BUFFER, AND SEND EXTENT EXTRACTING REQUEST TO EXTENT INFORMATION EXTRACTING • TRANSFORMING INTERFACE PROGRAM

S23
REQUEST TO READ FILE TO BUFFER

S24
ISSUE GAIN EXTRACTED EXTENT REQUEST TO EXTENT INFORMATION EXTRACTING • TRANSFORMING PROGRAM, AND GAIN EXTENT INFORMATION

S25
ISSUE END EXTENT INFORMATION • EXTRACTING TRANSFORMING PROGRAM

S26
SEND EXTENT INFORMATION, FILE NAME AND FILE SIZE TO DATA EXCHANGING PROGRAM IN RECEIVING SIDE,

S27
WHEN RESPONSE IS RETURNED, CLOSE FILE, AND COMPLETE FILE TRANSMISSION

FIG 8

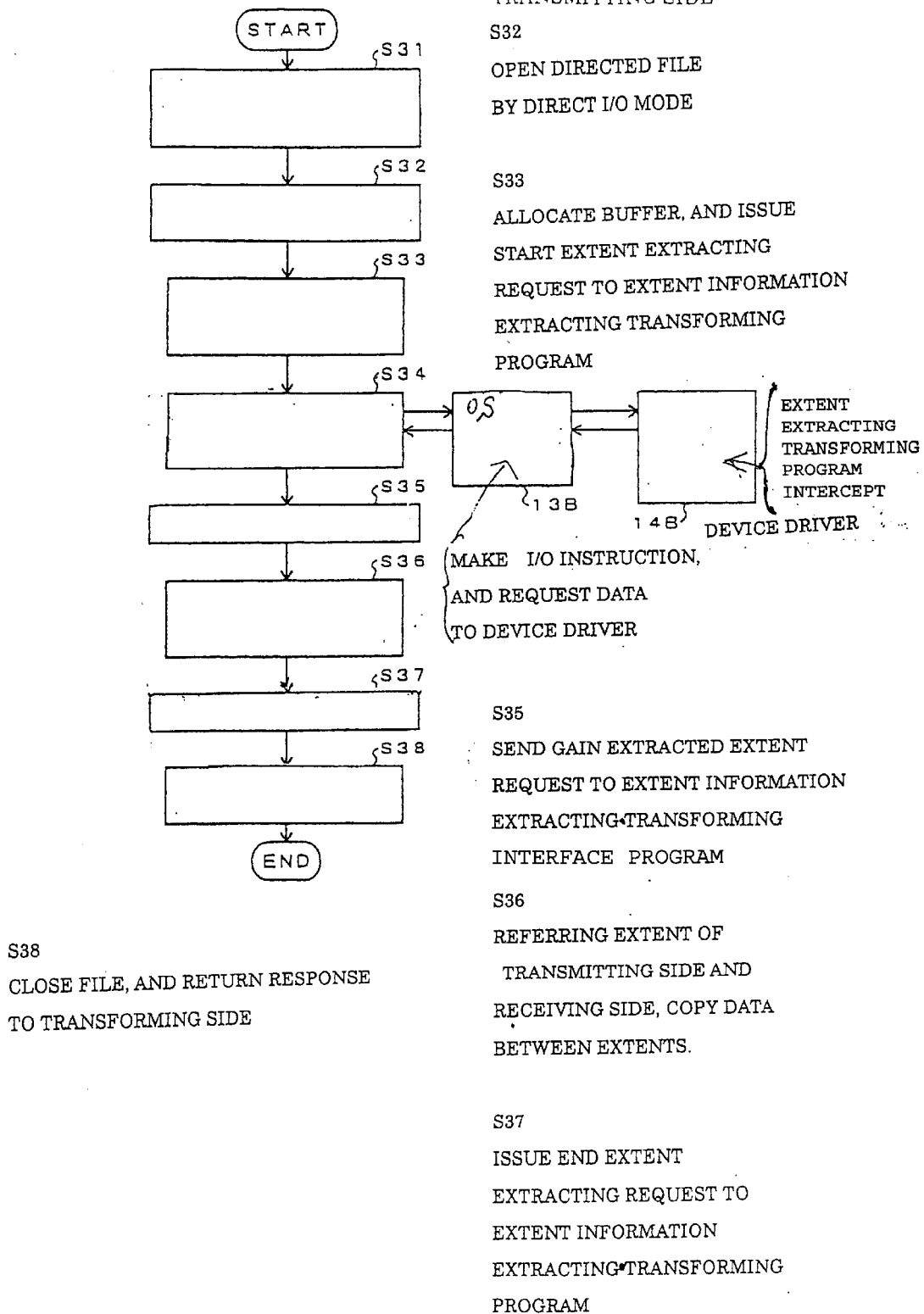

S31
RECEIVE EXTENT INFORMATION, FILE NAME AND FILE SIZE FROM TRANSMITTING SIDE

S32
OPEN DIRECTED FILE BY DIRECT I/O MODE

S33
ALLOCATE BUFFER, AND ISSUE START EXTENT EXTRACTING REQUEST TO EXTENT INFORMATION EXTRACTING TRANSFORMING PROGRAM

S34
MAKE I/O INSTRUCTION, AND REQUEST DATA TO DEVICE DRIVER

S35
SEND GAIN EXTRACTED EXTENT REQUEST TO EXTENT INFORMATION EXTRACTING•TRANSFORMING INTERFACE PROGRAM

S36
REFERRING EXTENT OF TRANSMITTING SIDE AND RECEIVING SIDE, COPY DATA BETWEEN EXTENTS.

S37
ISSUE END EXTENT EXTRACTING REQUEST TO EXTENT INFORMATION EXTRACTING•TRANSFORMING PROGRAM

S38
CLOSE FILE, AND RETURN RESPONSE TO TRANSFORMING SIDE

S41

ACCEPT FILE ACCESS
REQUEST FROM USER

S42

REQUEST EXTENT EXTRACTING TO DTA EXCHANGING PROGRAM OF ANOTHER
COMPUTER

S43

RECEIVE EXTENT INFORMATION FROM DATA EXCHANGING PROGRAM OF
ANOTHER COMPUTER

S44

MAKE I/O COMMAND TO
ACCESS DIRECTLY TO DISK DRIVE
BY USING FECEIVED EXTENT
INFORMATION, AND IMPLEMENT
READ OR WRITE DATA TO REQUESTED FILE

FIG. 10

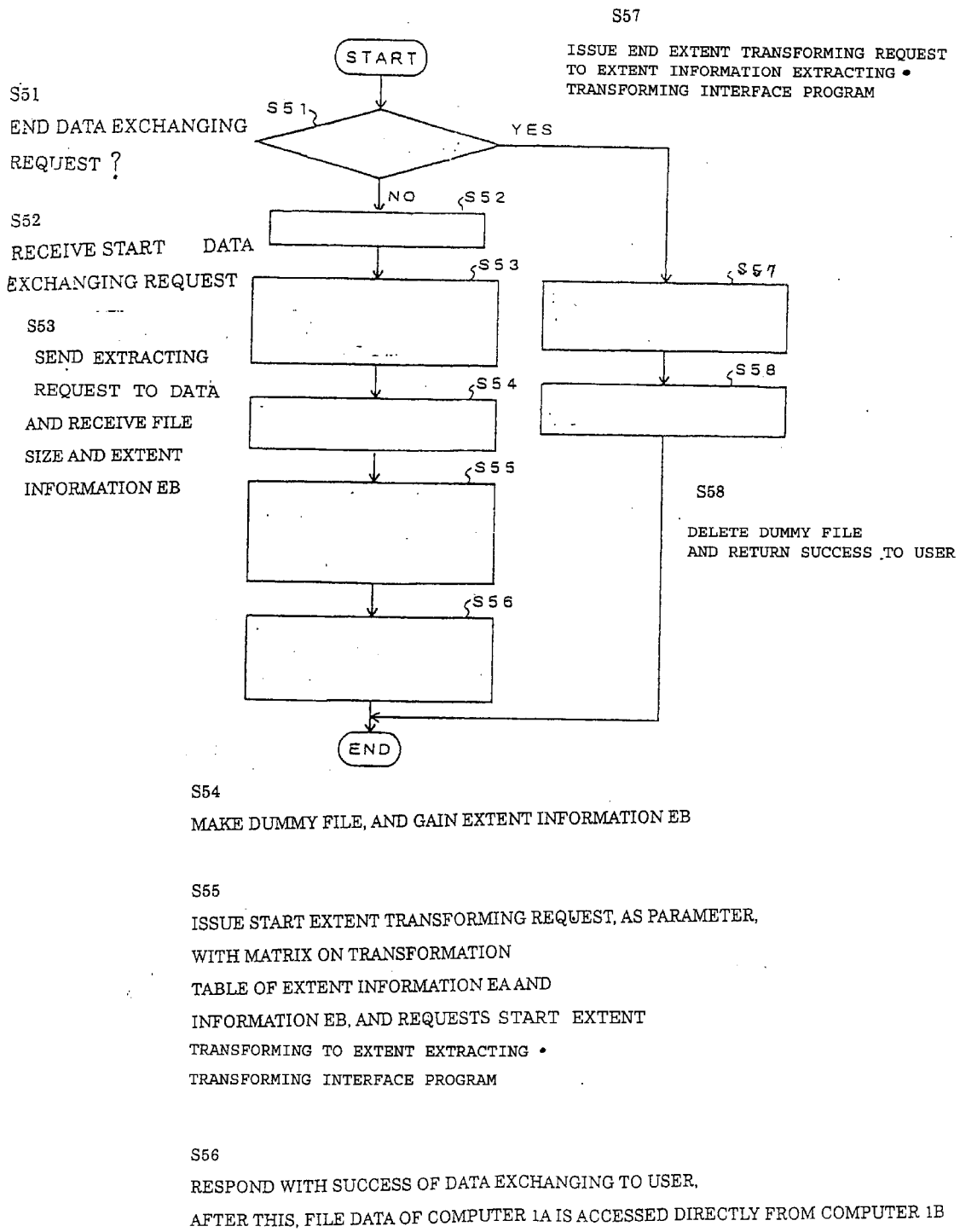

S51
END DATA EXCHANGING
REQUEST ?

S52
RECEIVE START DATA
EXCHANGING REQUEST

S53
SEND EXTRACTING
REQUEST TO DATA
AND RECEIVE FILE
SIZE AND EXTENT
INFORMATION EB

S57
ISSUE END EXTENT TRANSFORMING REQUEST
TO EXTENT INFORMATION EXTRACTING •
TRANSFORMING INTERFACE PROGRAM

S58
DELETE DUMMY FILE
AND RETURN SUCCESS TO USER

S54
MAKE DUMMY FILE, AND GAIN EXTENT INFORMATION EB

S55
ISSUE START EXTENT TRANSFORMING REQUEST, AS PARAMETER,
WITH MATRIX ON TRANSFORMATION
TABLE OF EXTENT INFORMATION EA AND
INFORMATION EB, AND REQUESTS START EXTENT
TRANSFORMING TO EXTENT EXTRACTING •
TRANSFORMING INTERFACE PROGRAM

S56
RESPOND WITH SUCCESS OF DATA EXCHANGING TO USER,
AFTER THIS, FILE DATA OF COMPUTER 1A IS ACCESSED DIRECTLY FROM COMPUTER 1B

EXAMPLE OF DATA STORING MODE

PRIOR ART

FAST DATA EXCHANGE SYSTEM BETWEEN DIFFERENT TYPE COMPUTER AND MEDIUM STORING PROGRAM OF EXTENT INFORMATION AND TRANSFORMATION

CROSS REFERENCE TO RELATED APPLICATIONS

The contents of Japanese Patent Application No.261,729/99, filed Sept. 16, 1999 in Japan are incorporated herein by reference.

BACKGROUND OF THE INVENTION

Field of the Present Invention

This invention relates to a data exchanging system, which is capable of quickly exchanging and sharing a file between plural computers running different types of operating systems (in the following, called OS), even if the disk space allocations in the system are unknown to each other.

BACKGROUND OF THE INVENTION

FIGS. 12 (A) and (B) are explanation drawings of examples of data exchange in the prior art.

In the prior art, FTP (File Transfer Protocol Program) is well known as a data exchange system between different OSs. FIG. 12 (A) shows an example of a file exchange system using FTP 110A and 110B, which applications work independently of the OS of each computer 100A, 100B respectively.

When sending the file 130A of the computer 100A to the computer 100B, the FTP 110A sends the file data read from the file 130A stored on the disk drive 120A by using an application program interface (in the following, called API), which a user program of the computer 100A uses to FTP 110B of another computer 100B over the network 140. FTP 110B of the computer 100B which has received the data writes it to the file 130B of the disk drive 120B of the computer 100B by using the API.

This system is effective as a system receiving and sending a file between computers, whatever the kind of OS they have, but it has a drawback of a large overhead caused by data transfer over the network.

On the other hand, as a system sharing a file between plural computers using a distributed file system such as NFS(Network File System) is known. FIG. 12 (B) shows an example of the distributed file system.

The distributed file system is composed of two kinds of computers which are a server computer 200S having a file 230 and client computer 200C accessing to the file 200.

The client computer 200C sends a request to the server computer 200S, and OS 210S of the server computer 200S accesses to a file on a disk drive 220, and returns the result to OS 210C of the client computer 200C. For example, when writing into the file 230, the client computer 200C sends the data to be written to the server computer 200S over the network 240, and the server computer 200S writes the data into the file 230.

In the distributed file system like this, the file data is sent over the network 240, so that it causes a problem of a large overhead. Further, as the file operation is implemented by the OS, so that OS 210C of the client 21OC should be modified so as to cooperate with the OS 210S of the server 200S for using the user program without modification.

Generally as files are stored in a disk drive when the disk drive is connected directly to plural computers and is accessed directly by the computers which exchange or share the data with each other, the above mentioned problem caused by sending data over the network is solved. But, for sharing the data on a disk drive, it is necessary to know how each OS stores the data on the disk drive and for each computer to load the same type of OS, so that the realization is difficult between OSs made by different vendors.

FIG. 13 shows an example of a prior art system sharing the disk drive by plural computers. Each disk drive 320, the computer 300A, and the computer 300B are connected by a fast network 350, which transmits a disk protocol, called a storage area network (SAN). OS 310 A and 310B of computer 300A and 300B each can access directly to the disk drive 320B through the storing area network. Accordingly when the OS 310A and 310B are same kinds, the computer 300A and 300B can share the file on the disk drive 320, so as to implement directly input and output for the file.

But when the type of the OS 310A and the OS 310B are different type (for example, the physical organization of the file 330A, which the OS 310 A makes and manages, and the file 330B, which the OS 310B makes and manages are different), the direct access from the OS 310A of the computer 300A to the file 330B, or the direct access from the OS 310B of the computer 300B to the file 330A are impossible.

Of course, if the file system of the OS 310A is modified so as to access to the file 310B, access to the file managed by OS 310B is realized, but the modification cost is great. Further when necessity to access another file which is made of another kind, the modification for each kind of the file system is necessary, so that actual realization is impossible.

SUMMARY OF THE INVENTION

An object of the present invention is to resolve the above mentioned problem. Another object of the present invention is to quickly exchange or share a file between plural computers of different types of OSs, even if data layout on the external storing device for the file is unknown.

The present invention comprises, for sharing, transmitting or exchanging files managed by operating system between plural computers having different types of operating systems, means for extracting file locations on an external storing device independently of the file systems which are programs in the operating system managing the files, and means for sharing, transmitting and exchanging with another computer by implementing accessing to the external storing device based on the file location information by a device driver which implements an input and output to an external storing device.

A fast data exchange of the present inventions (sharing, transmitting and exchanging) between different kinds of computer is realized by means for extracting the location of the user file data stored by OS on an external storing device such as a disk drive without changing an existing file system of OS except a minimum change of the OS, device drive.

The device drive which implements inputting to and outputting from the storing device includes means executing the file access by changing the extent information, which represents a location of the file directed by a file system on the external storing device to another extent information directed in advance.

The above-mentioned means are implemented by a disk drive for an external storing device, for which the storing system on external storing device managed by another operating system is different, by changing an extent information sent from a file system to another extent information by using an exchanging table which is prepared in advance.

Further the present invention comprises means for transmitting the extent information directing the location of a file in the external storing device from a first computer to a second computer, when transferring the file from the first computer to the second computer of which the OSs are different from each other, means for copying data in the file and realizing the file transmitting by accessing directly to the external storing device based on the extent information received by the second computer.

By this, a fast file transmitting is realized without transmitting the real data only by exchanging the extent information between computers, of which storing systems for the external storing device of file are unknown.

Further the present invention provides means for requesting an extent information of a file, which another computer manages, means for gaining the extent information, and means for sharing the file by accessing directly to the external storing device, in which the file exists by using the extent information obtained from another computer.

By this, sharing directly the file data between computers of which file storing systems are unknown each other can be implemented.

Further the present invention provides means for requesting the extent information of a file, which an OS of another computer manages and obtaining the extent information, means for making a file, which an OS of this computer manages, and obtaining the extent information, and means for realizing the sharing of the file on the external storing device by changing the two extents of the information and accessing.

By this, a user program can share directly the file in the external storing device between two computers, of which the data layout for the file on the external storing device are unknown without changing the existing OS.

For realizing the above mentioned process without modifying an exiting OS or user program, an application program for an interface with a device driver implementing accessing to an external storing device with computer is comprised, and the program implements following processes. That is, processing, when receiving a request of start of extent information extracting thereafter from the data exchanging program, sending a request of start of intercept to the device driver, and gaining the extent information from the device driver to return it to the request side for the request of the gain of extracting extent information thereafter from the data exchanging program. Another processing, when receiving the request of start of extent transforming from the data exchanging program, sending a pair of extent information of the extents to transform, and making the device driver to implement the access of the transformed extent information to the device driver for the access thereafter to the external storing device.

Also, a program of a device driver implementing an access to an external storing device for a request of input and output of data from an OS of a computer is comprised and the program implements the following processes. That is, a processing storing information requesting a directed buffer area specified by request of intercept, a processing intercepting a request of input and output for the buffer area issued by the OS and storing the extent information, a processing returning the accumulated extent information to a original request (requester) for the request of extracted extent information obtaining, and a process storing a pair of the directed extent for the request of start of transforming extent information to implement the access to transformed extent based on the pair of the stored extent information in the access thereafter to the external storing device.

The above mentioned program is stored in an appropriate storing medium of a portable semiconductor memory which a computer can read and a semiconductor memory and a hard disk.

Mentioned above, the following mechanisms are realized, and the problem of the prior art is solved by the present invention.

1) An extent information extraction mechanism extracting where OS stores the user file data on the disk.
2) A mechanism sending the extent information extracted by the above mentioned extraction mechanism over a network.
3) A mechanism transferring data directly between the different extents of the disk.
4) A mechanism preparing an association table (transformation table) of the two different extents which are directed, changing a request of input and output of the extent information access corresponding to the association table.

These, together with other objects and advantages which will be subsequently apparent, reside in the details of construction and operation as more fully described and claimed hereinafter, with reference to the accompanying drawings, wherein like numerals refer to like parts throughout.

BRIEF DESCRIPTION OF THE DRAWINGS

FIG. 1 shows a block diagram of an example of this invention.

FIG. 2 shows an outline of the process of transmitting a file between two computers running a different OS.

FIG. 4 shows an outline of the file exchanging process sharing files between the computers, which run different OSs.

FIG. 6 shows the process of an extent information extracting·transforming program.

FIG. 7 shows the process of a data exchanging program on a transmitting side for a file transmitting.

FIG. 8 shows the process of a data transmitting exchanging program on a receiving side for a file transmitting.

FIG. 10 shows the process of a data exchanging program for file exchanging.

DESCRIPTION OF THE PREFERRED EMBODIMENTS

FIG. 1 shows a block diagram of an example of system components of the present invention. On the plural computers 1A, 1B sharing a disk drive 2, user programs 10A, 10B and OSs 13A, 13B, data exchanging program 11A, 11B, extent information extracting·transforming interface program 12A, 12B, extent information extracting·transforming program 14A,14B, and on the disk drive 2, data transferring function between the extents 20 are arranged.

The computers 1A, 1B can access directly to the disk drive 2 through the storage area network(SAN) and disk interface etc.

The data exchanging program 11A and the extent information extracting·transforming interface program of the computer 1A (like computer 1B) work as application on OS 13A, and the extent information extracting·transforming program 14A works as a device driver controlling the real I/O to OS 13A and the disk drive 2.

An interface with the OS 13A which is necessary for making a device driver is generally available from a vendor of computer 1A for connecting the disk drive 2 which is dealt by a vendor different from the vendor of the computer 1A. By this reason, the extent information extracting·transforming program 14A can be made independent of the OS 13A of it.

The extent information extracting·transforming interface program 12A receives a request issued from the data exchanging program 11A, requests the process to the extent information extracting·transforming program 14A and returns the result to the data exchanging program 11A. For implementing the interaction, an interface for sending the information peculiar to the device vendor (OS providing as a standard) is used. The data transfer function between extents 20 on the disk drive 2 is optional, and when the function is not provided, data exchanging program 11A executes instead of it.

Figure 3:
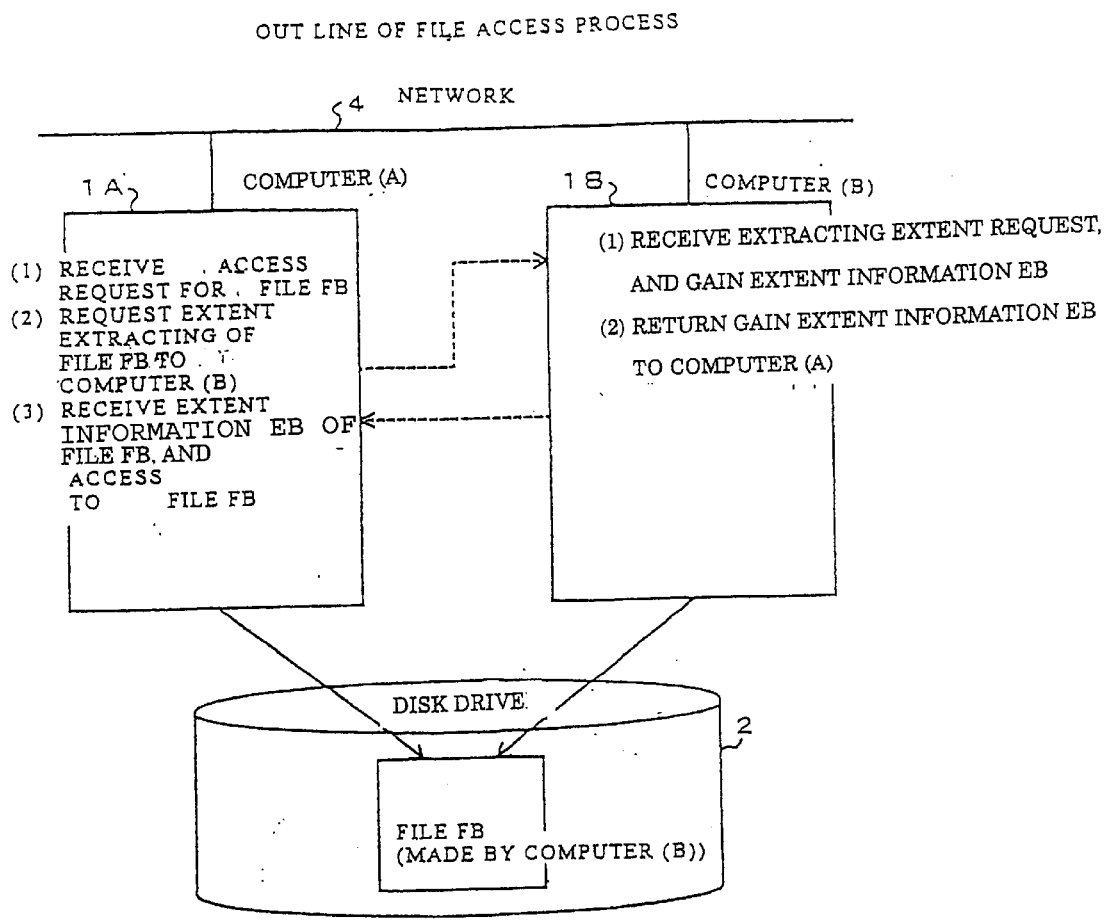
FIG. 3 shows an outline of the process of directly accessing a file created by another computer running different OS.

Before explaining details of the above mentioned each program, outlines of file transferring, file accessing and file exchanging process between different computer realized by the above mentioned program is explained using FIG. 2~FIG. 4.

FIG. 2 shows an outline of a process transferring the file on the disk drive 2 managed by the OS 13A of the computer 1A to the computer 1B.

In the prior art, as the data layout on the disk drive 2 of the file FA managed by the OS 13A of the computer 1A and the data layout on the disk drive 2 of the file FB managed by the OS 13B of the computer 1B are different, the file transfer is implemented by transferring the real data of the file A from the computer 1A to the computer 1B over the network 4, and the computer 1B writes the data into the file FB. For this reason, there is a problem that the overhead for transferring the real data is big.

This invention realizes the file transfer as the following without the real data transfer of the file FA over the network 4, but only by transferring the minimum data.

[Process of the computer 1A]
(1) Open a file FA.
(2) Gain an extent information EA of the file FA.
(3) Send the gained extent information EA of the file FA and the file name FB and the file size which information to the computer 1B. The extent information EA contains one or more disk block numbers, each of showing the starting disk block storing the contents of file FA and the file offset of the file FA associated with the starting disk block. There are cases of plural triplets of the disk block number, the number of disk blocks and file associated offset.
(4) Wait for a response from the computer 1B.
(5) Close the file FA.

[Process of the computer 1B]
(1) Receive the extent information EA, the file name FB and the file size from the computer 1A.
(2) Make a new file FB of same size with file FA on the disk drive 2, and open it.
(3) Gain the extent information EB of the created file FB.
(4) Using the extent information EA sent from the computer 1A and the extent information EB of file FB, copy the data between the extents. The data copy is executed by the data transferring function 20 between extents of the disk drive 2, or reading the data of the file FA by accessing by the computer 1B, the disk drive 2 directly, and writing it in the file FB.
(5) Ending the copy of the data, close the file FB.
(6) Send the response to the computer 1A.

FIG. 3 shows an outline of the process of the direct accessing by the computer 1A to the file FB in the disk drive 2 managed by the OS 13B of the computer 1B. Generally the data layout on disk drive 2 managed by the OS 13B of the computer 1B is different from the data layout managed by the OS 13A of the computer 1A, so that the computer 1A can access the disk drive 2, but cannot read or write directly the file FB. In this invention, the access to the file FB of which data layout to the disk drive 2 is unknown can be implemented by the computer 1A.

[Process of the Computer 1A]
(1) Receive a request accessing to the file FB from the use program.
(2) Request an extent information extracting of the file FB to the computer 1B over the network 4.
(3) Receive the extent information EB from the computer 1B over the network 4, and using the extent information EB, access directly to the file FB on the disk drive 2.

[Processing of the Computer 1B]
(1) Receive a request of the extent information extracting (EXTRACTING EXTENT request) from the computer 1A, and gain the extent information EB of the file FB.
(2) Return the gained extent information of the file FB to the computer 1A over the network 4.

FIG. 4 shows an outline of process of a file exchanging that shares the file FB on the disk drive 2 managed by the OS 13B of the computer 1B, which is realized without modifying the OS 13A and the user program 10A.

Generally the data layout on the disk drive 2 of the file FB managed by the OS 13B of the computer 1B is different from the data layout on the disk drive 2 of the file FA managed by the OS 13A of the computer 1A, so that the computer 1A can accesses to the disk drive 2, but cannot access directly the file FB for sharing. In this invention, like in the following, the user program 10A of the computer 1A shares and access to a file FB of which data layout on the disk drive 2 is unknown. In this file exchanging process, in order that the computer 1A can access to the file FB managed by the OS 13B running on another computer 1B, a dummy file FA corresponding to the file FB, that is, has not the real data is prepared and an access to the file FA is transformed automatically to the file FB in the internal of the device driver. A conception of the access to meta data MA such as a directory of the computer 1A corresponding to the meta data MB is realized.

[Process of Computer 1A]
(1) Receive a request sharing the file FB from a user of the computer 1A.
(2) Request the extracted extent information of the file FB to the computer 1B over the network 4.
(3) Receive the extracted extent information of the file FB and file size from the computer 1B over the network 4.

(4) Make a file FA of the same size with file FB on the disk drive 2.
(5) Receive the extent information EA of the made file FA.
(6) Make a transformation information consisting of extent information EA of the file FA and the extent information EB of the file FB, and register to the device driver (extent information extracting·transforming program) 14A of the computer 1A. The transformation table, which associates the extent information EA with the extent information, is made in the device driver.
(7) After this, when the file FA is accessed by a user program on the computer 1A, the extent information EA of the file FA is transformed to the extent information EB of the file FB by using the transformation table in the device driver, and the data are written and read in the file FB. Return a response to user.

[Process of the computer 1B]
(1) Receive EXTRACTING EXTENT request from the computer 1A, and gain the extent information EB of the file FB.
(2) Return the extent information of the file FB to the computer 1A over a network 4. Details of the each program, which realizes the above mentioned process shown in FIG. 1 is explained in order of the sequence. It is important that the fast data exchange between different computers is realized by only adding the incidental application program to the device driver without affecting the existing OS and user program.

1. The extent information extracting·transforming interface program

Figure 5:
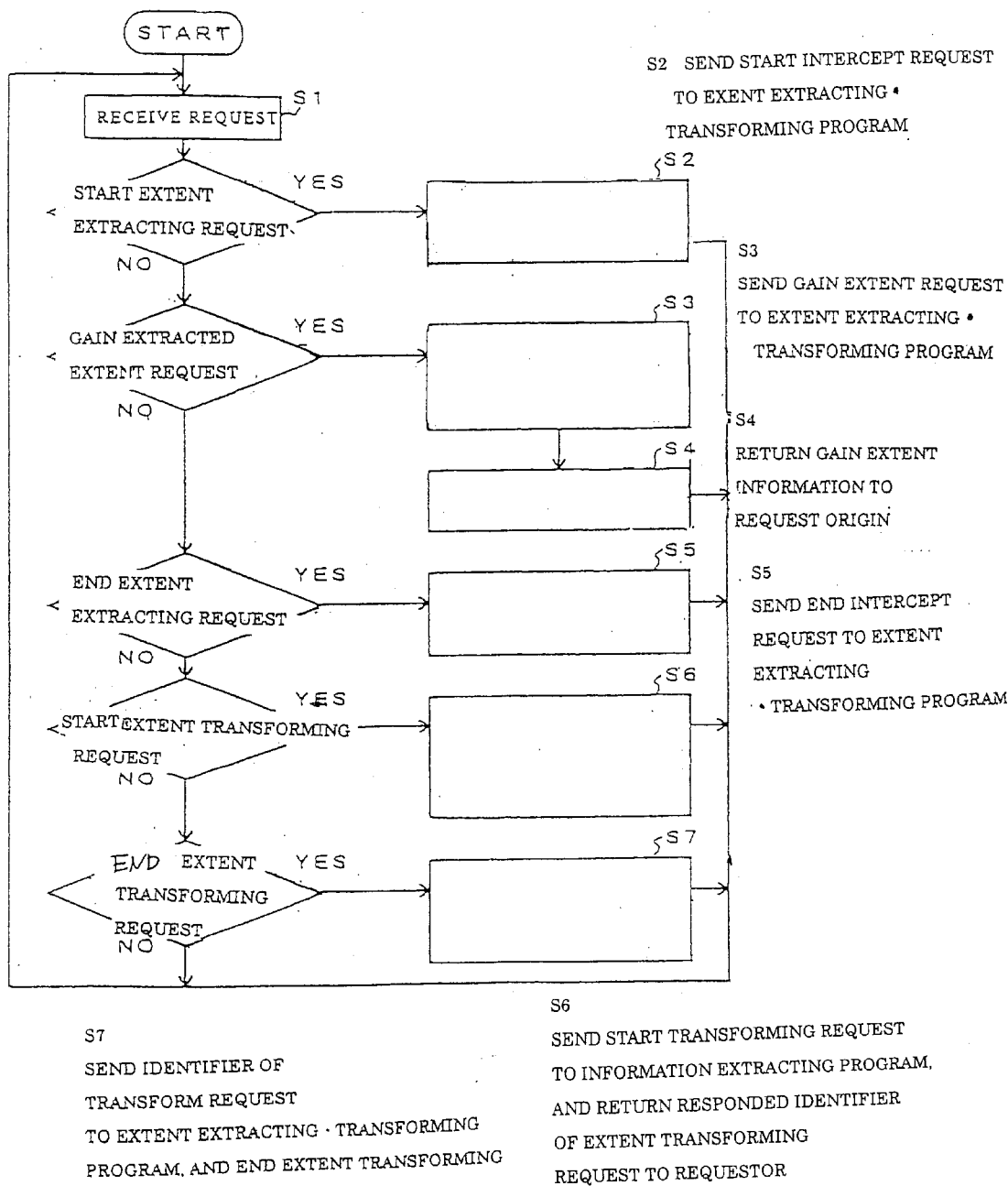
FIG. 5 shows an outline of the process of an extent·information extracting transforming inter face program.

FIG. 5 shows an outline of process of the extent information extracting·transforming interface program 12A (like 12B). The extent information extracting·transforming interface program 12A accepts one of START EXTENT EXTRACTING request, GAIN EXTRACTED EXRENT request, END EXTRACTING request, START EXTENT TRANSFORMING request or END EXENT TRANSFORM (step 1).

[START EXTENT EXTRACTING request]
When receiving START EXTENT EXTRACTING request, a START INERCEPT request of starting of extent information extracting process, a START INTERCEPT request of which parameters are matrix having elements of a pair of a main memory start address and the length of buffer, which specifies buffer allocated by date exchange program 11A is sent to the extent information extracting·transforming progra 14A (S2).

[GAIN EXTRACTED EXTENT request]
When accepting a GAIN EXTRACTED EXTENT request, the GAIN EXTRACTED EXTENT request is sent to the extent information extracting·transformation program 14A to obtain the extracted extent information. The input interface in this time is the specified start main memory address of a buffer by the original request (requester). As output, the extent information matrix is returned. Each entry of the matrix contains start disk block addresses, the number of blocks and the associated buffer start addresses where data of disk blocks are read (or written) (S3).
The information responded by extent information·extraction transformation program 14A is returned to the original requester (S4).

[END EXTENT EXTRACTING request]
When accepting an END EXTENT EXTRACTING request, an END INTERCEPT request of which parameters is main memory start address indicating buffer specified by the request is sent to the extent information extracting·transforming program 14A (S5).

[START EXTENT TRANSFORMING request]
When receiving a START EXTENT TRANSFORM, the START EXTENT TRANSFORMING request of which parameter is a matrix composed of a pair of the extent information specified by the original request is sent to the extent information extracting·transforming program 14A and a responded identifier of EXTENT TRANSFORMING request is returned to the requester (S6). The identifier is a unique number which identifies the request of extent information transforming. This value is maintained, for example added for each START TRANSFORMING request.

[END EXTENT TRANSFORMING request]
When accepting an END EXTENT TRANSFORMING request, an identifier of which parameter is the directed identifier of the EXTENT TRANSFORMING request is sent to the extent information extracting·transforming program 14A, to quit the associated extent information transformation process (S7).

2. Extent Information Extracting·Transforming Program
FIG. 6 shows an outline of process of the extent information extracting * transforming program 14A (like 14B). The extent information extracting·transforming program 14A accepts one of the START INTERCEPT request, the GAIN EXTRACTED EXTENT request, the END INTERCEPT request, the START EXTENT TRANSFORMING request or the END EXTENT TRANSFORMING request (step 11) requested from the extent information extracting·transforming interface program 12A, and return the response.

[START INTERCEPT request]
When accepting a START INTERCEPT request, it registers in a buffer region (start address and length) specified by the parameter to make it an object of the intercept (S12). After this, up to accepting the associated END INTERCEPT request, the input output request issued by the OS13A is analyzed. If the request is for reading to (or writing to) a registered buffer, the request is intercepted, and the disk block number, length and a corresponding buffer address (in the following, it is called as extent information) are saved on memory and the completion of the input and output is responded to the OS 13A. For input and output request other than intercept object, the request is forwarded to the disk drive 2, and the input and output operation is performed (S13).

[GAIN EXTRACTED EXTENT request]
In case of GAIN EXTRACTED EXTENT request, the saved extent information corresponding to the specified start address of buffer is responded, the saved information is cleared (S14).

[END INTERCEPT request]
When an END INTERCEPT request is accepted, the intercept request registered by a START INTERCEPT request is unregistered and intercepting input and output requests for the specified buffer is terminated (S15).

[START EXTENT TRANSFORMING request]
When accepting a START EXTENT TRANSFORMING request, matrixes composed of a pair of a source extent information and a target extent information specified by the requester are registered as the transformation table. An identifier of the EXTENT TRANSFORMING request which identifies specially each EXTENT TRANSFORMING request is added, and responded to the requester (S16). The following process transforming extent information becomes active up to an END EXTENT TRANSFORMING request with the same identifier of the EXTENT TRANSFORMING request. The input output request issued by the OS 13A is analyzed, and an input and output request reading (or writing) on the disk area the corresponding source extent information is transformed to an input and output requests reading (or writing) on the disk area specified by corresponding target of extent information (S17), and it is passed to the disk drive 2. The request of input and output requested by the OS13A does not match the source extent information are forwarded to the disk drive 2 as they are.

[END EXTENT TRANSFORMING request]

When receiving an END EXTENT TRANSFORMING request, based on the directed identifier of the EXTENT TRANSFORMING request, the corresponding information in the above mentioned table is deleted, and transforming extent information process is terminated (S18)

3. Data Exchanging Program

Data exchanging program 11A (like 11B), using the interface provided by the extent information extracting·transforming interface program 12A, transfers a file quickly to other computer or shares data with other computer. This program accepts any one of FILE TRANSMISSION requests, FILE ACCESS request and FILE EXCHANGE request. In this explanation, the data exchanging program works all the time in the system, but it is capable to be started every necessary time.

In a file system of OS 13A, the OS 13A stores data that control user data as well as user data. The data in a block and the user data are not perfectly same, but in this explanation, a case that data in a block and user data are same is explained mainly. A process in a case of not same data is explained later additionally.

[File Transmission]

When a user of the computer 1A requests the data exchanging program 11A to transfer a file by a FILE TRANSMISSION request, the data exchanging program 11A interacts with the data exchanging program 11B on the specified computer (for example computer 1B) to perform file transfer.

FIG. 7 shows the process the data exchanging program 11A on a sending side performs for this request, and FIG. 8 shows the process the data exchanging program 11B on a receiving side performs.

a. Process of Data Exchange Program 11A on a Data Sending Side (1) A specified file is opened by a direct I/O mode, and get the file size (S21). Here the direct I/O mode refers to disks I/O operation which is performed directly between the disk block and the user buffer without transferring data through an OS buffer except a special case.

(2) The buffer is allocated, and is pinned to the main memory not so as to be paged out by OS 13A. Then START EXTENT EXTRACTING request with a parameter of the real address and size of the buffer allocated is sent to the extent information extracting·transforming interface program 12A (S22).

(3) Reading the file into the buffer is requested by using API provided by the OS 13A (S23). As the result, the OS 13A makes a disk I/O command for reading the data on a disk into the specified buffer, and pass it to the device driver. This I/O command is intercepted by the extent information extracting·transforming program 14A, and the extent information extracted from the I/O command is saved.

(4) Next, GAIN EXTRACTED EXTENT request is issued to the extent information extracting·transforming interface program 12A, and the extent information is obtained (S24).

(5) END EXENT EXTRCTING request with a parameter of the real address specified in step (2) is issued to the extent information extracting·transforming interface program 12A (S25).

(6) The obtained extent information in step (4), the file name and the file size are sent to the data exchanging program 11B on the computer 1B to which the file is transmitted, and waits for the response (S26). When the response is returned, the file is closed and the completion of the file transmission is responded to the user (S27).

b. Process of the Data Exchanging Program on a Receive Side (Shown in FIG. 8)

When the data exchanging program on the computer 1B, which is activated by the step (6), receives the extent information, the file name and the file size (S31), the following (7)~(14) are performed.

(7) The specified file is created and the file is opened by the direct I/O mode (S32).

(8) The buffer is allocated, and the allocated region is pinned to the main memory not so as to be paged out by the OS 13B. Then, START EXTRACTING request of which parameters are the allocated buffer's real address and size is issued to the extent information extracting·transforming interface program 12B (S33).

(9) A request for writing contents of the buffer into the file is issued (S34). This writing request is a dummy input and output request for extracting the extent information, so that the data can be composed of any content. As the result, the OS 13B makes an I/O command for writing the content of the specified buffer into the block of the disk, and requests it to the device driver. The I/O command is intercepted by the extent information extracting·transforming program 14B, and the extracted extent information is saved in the extent information extracting·transforming program 14B.

(10) A GAIN EXTRACTED EXTENT request with a parameter of the buffer starting real address allocated in step (8) is sent to the extent information extracting·transforming interface program 12B to obtain the saved extracted extent information (S35).

(11) Copy data on disk blocks of disk drive 2 corresponding to the extent information (source extent information) received from the computer 1A side and onto disks blocks of the disk drive 2 defined by the extent information (target extent information) gained from the computer 1B side. When the lower disk drive 2 has a function of copying the data (data transferring function between extents of FIG. 1), it is executed by the function of the disk drive 2, otherwise the data exchange program 11B reads the data on disk blocks corresponding to the source extent information , and writes them onto the disk blocks corresponding to the target extent information (S36).

(12) END EXTENT EXTRACTING request with a parameter of the start real address of the buffer, that is the same as the address sent in step (8) is issued to EXTENT information extracting·transforming interface program 12B (S37).

(13) The file is closed, a response is responded to the data exchanging program 11A on the computer 1A and completes the process (S38).

[File Access]

This is a function that the user program 10B on the computer 1B accesses directly the file data (for example, file data made by the OS 13A) of the computer 1A on the disk drive 2. In this case, the modification of OS 13B of the computer 1B must be permitted.

The OS 13B of the computer 1B is modified to implement, a function of accessing a file created by the computer 1A. The data exchanging program runs on the computer 1A.

When a user program 10B on the computer 1B request an access to a file of the computer 1A. OS13 acts as the following. Now, as a method finding whether the file is in the computer 1A or not, using file name converting etc. is possible.

a. Process of converting the file managed by OS 13A

Figure 9:
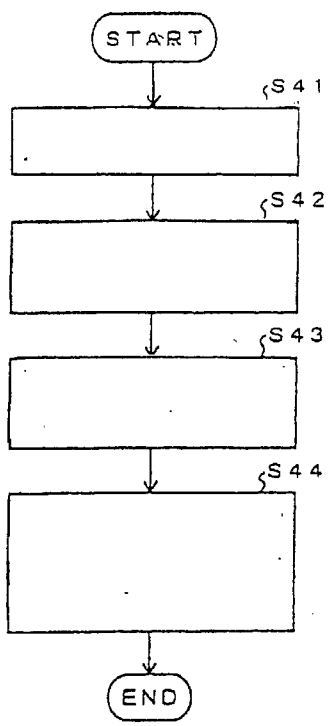
FIG. 9 shows the process of a file system in an OS for accessing to a file created by another computer.

FIG. 9 shows an outline of process conducted by the OS 13B of the computer 1B.

(1) When an access for a file is requested by a user program 10B, OS 13B determines whether the file is managed by the computer OS 13B of the computer 1B or managed by the OS 13A of the computer 1A by evaluating specified file name. When the file is managed by the OS 13B of the computer 1B, a file access same as a prior art is implemented, when the file is managed by the OS 13A of the computer 1A, the following process is implemented (S41).

(2) The file name and offset and size are sent to the data exchanging program on the computer 1A for extracting the extent information (S42).

(2') OS 13B receives an extracted extent information from data exchanging program 11A of the computer 1A (S43).

(3) An I/O command accessing directly to the disk drive 2 by using the received extent information is made up, and an input and output request is passed to the device driver to read or write the disk blocks containing specified file data (S44).

b. Process of data exchanging program 11A

The data exchanging program 11A on the computer 1A, which receives GAIN EXTRACTED EXTENT request of extent information extracting from the computer 1B implements almost same process with the explanation in the title of [file transmission], and responds with the extent information. A difference is that read and write is sent to the data exchanging program 11A, and reading or writing in the dummy is implemented for the file system of OS 13B. For the optimization, it is capable that the extent information extracting is executed at file opening, instead of each request of access.

[File Exchanging]

The file exchanging is a function which allows two different systems of which existing OS are not modified to share directly a common file data. This file exchanging cannot be applied to the system where data are accessed through a buffer of system (that is, in a file format that a user data and control data exist mixed on a same disk block).

In the following, the file exchanging is explained by using an example that a system creating the file is a computer 1A, and a system accessing the file is computer 1B. FIG. 10 shows an outline of the process performed by the data exchanging program working as an application of the computer 1B.

The data exchanging is started by issuing START DATA EXCHANGING request to the data exchanging program 11B working on the computer 1B by a user or user program 10B. When the data exchanging process is started by the user program 10B, the access to a file made by the computer 1A from the user program 10B of the computer 1B is capable until directing end of a data exchanging. The data exchanging program 11B processes the following process.

a. Process of the Data Exchanging Program (1) It is determined whether a request of file exchange request is END DATA EXCHANGING request or START DATA EXCHANGING request (S51). When it is END DATA EXCHANGING request, the process goes to step S57. Otherwise, START DATA EXCHANGING request requested by a command from a user or START DATA EXCHANGING request requested by the user program is accepted (S52).

(2) When START EXTENT EXCHANGING request is accepted, the data exchanging program 11B sends EXTENT EXTRACTING request to the data exchanging program 11A on the computer 1A, and receives the file size and the extent information as a result (extent information EA) (S53).

(3) The data exchanging program 11B makes a file with a size responded from the data exchanging program 11A and a name specified by the user, and obtain the extent information EB of the created file through the extent information extracting-transforming program (S 54). In this time, how the buffer is allocated and how the extent information extracting is done are in accordance with the system explained in the file transmission. That is, the extent information EB is obtained by issuing START EXTENT EXTRACTING request, GAIN EXTRACTED EXTENT request and END EXTENT EXTRACTING to an extent information extracting-transforming interface transforming program 12B.

In this time, when data written through the buffer of OS13B exists, that is, both of the control data which are known only by the OS 13B and user data exist in the common disk block, failure of the data exchanging is responded.

(4) START EXTENT TRANSFORMING request is issued to the extent information extracting transformation interface program 12B with the parameter which is a matrix (transformation table) composed of a pair of the extent information EB extracted in the computer in itself and the extent information EA noticed from the computer 1A (S55).

(5) A respond with a success of data exchanging is returned to a user or a user program. After this, when the user program 10B of the computer 1B or another user program accesses to the corresponding to the file through the OS 13B, the file data of the computer 1A is accessed directly through the extent information extracting-transforming mechanism provided by the extent information extracting-transforming program 14B without intermediary of the OS of another computer 1A (S56).

(6) When the user or the user program request terminating data exchanging to the data exchanging program 11B (S51), the data exchanging program 11B issues END EXTENT TRANSFORMING request to the extent information extracting-transforming interface program 12B (S57), then the dummy file created at step 54 is deleted and returns a success to the user or the user program 10B (S58).

FIG. 11 shows an example of a placement method of data onto a disk block for a file (file format). In the above mentioned explanation, as shown in FIG. 11(A), an example the only data D1 written by a user is on a disk block is explained. But, in some OS file formats of the OS 13A, there is a case that the OS 13A stores both user data and the control data apart from the user data onto a common single disk block. FIG. 11(B) shows an example, and the control data added by the OS 13A and the user data D2 accessed by the user program 10A are mixed.

In this case, as shown in figure (C), for the read request to the disk block 50, the OS 13A reads at a time the content of the disk block 50 into the buffer 52 of the OS 13A maintained apart from the user buffer 51, and after this, extracting only the user data D2, and transfer the user data to the user buffer 51.

Figure 11A:
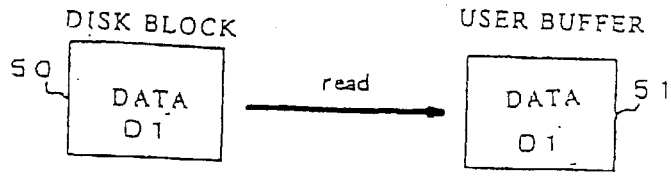
FIGS. 11(A)–11(E) show a storing mode (file form) of data to a disk block.
Figure 11B:
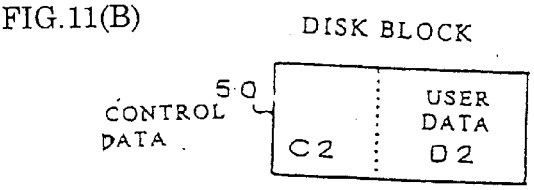
Figure 11C:
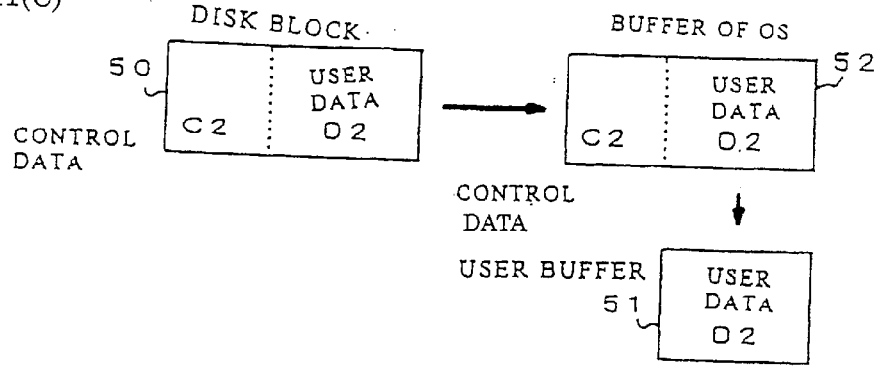
Figure 11D:
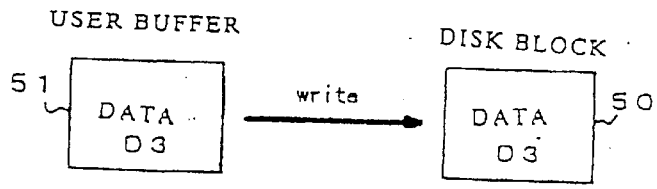
Figure 11E:
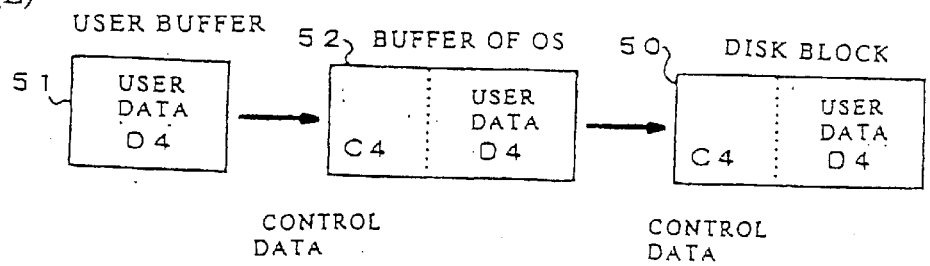
Figure 12A:
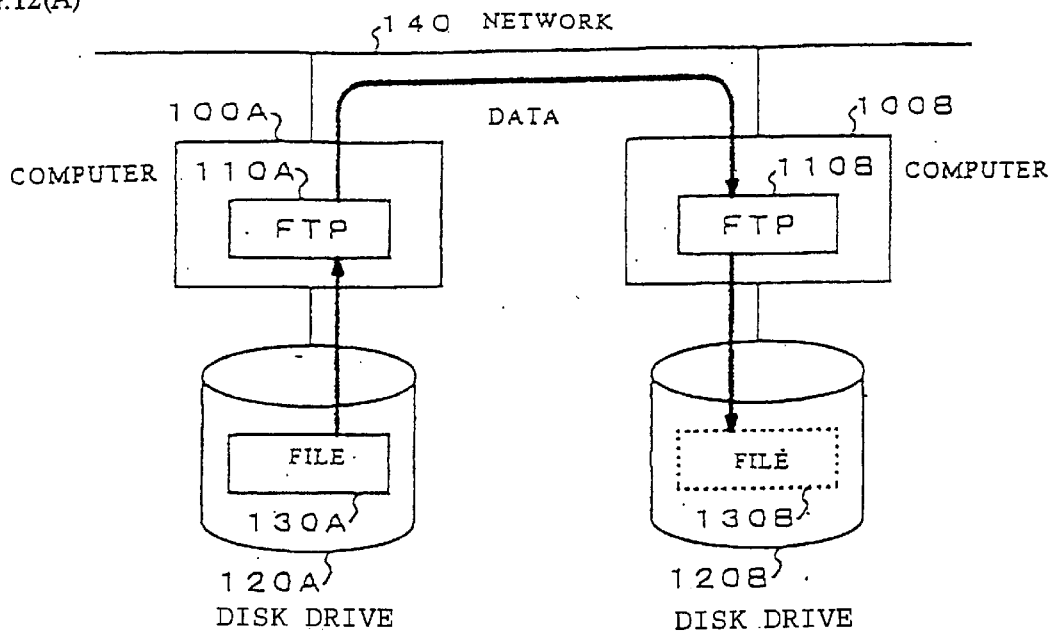
FIGS. 12(A), 12(B) show an example of data exchange of prior art.
Figure 12B:
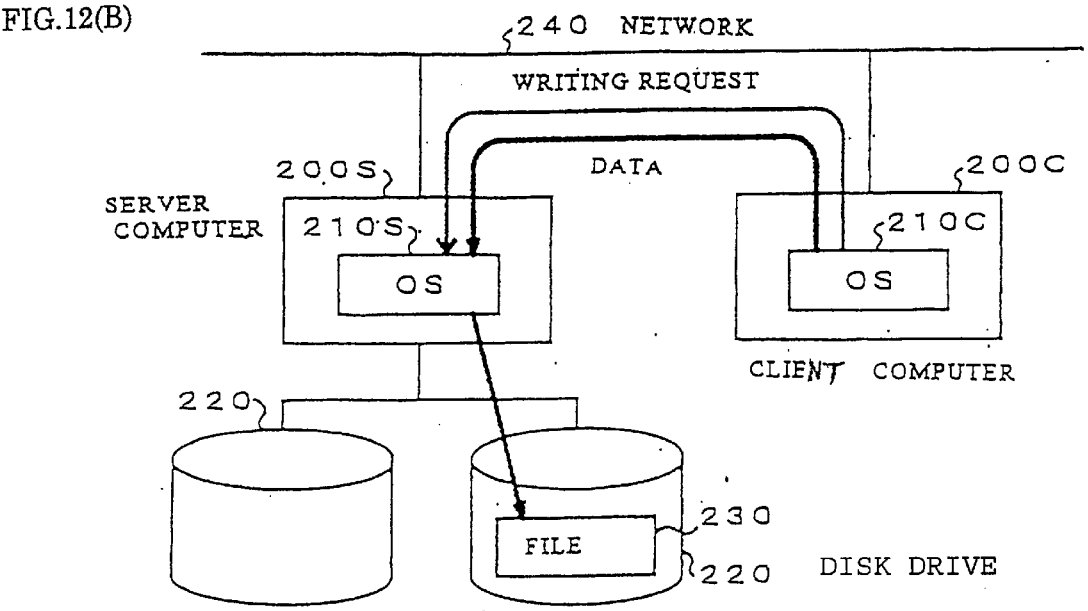

Process of writing data is same, too, when the OS 13A does not add the control data to the user data, as shown in FIG. 11(D), the data D3 containing data in the user buffer 51 as they are contained are written on a disk block 50, but when the OS 13A adds the control data to the user data, as shown in figure 11(E), the user data D4 which are requested writing in buffer 52 are written on a disk block 50 by adding the control data created by the OS 13A.

In this case, it is necessary for the control data added by the OS 13A to be insensible for another computer. The control data depends on an OS. Therefore, in the file transmission and the file access between different computers it is necessary that only the user data are accessed, even, or if the data are added the control data.

For this, the file transmitting is processed like in the followings. Concerning to the data exchanging program 10A, the explanation is supplemented. At first, when the extent information extracting is requested to the extent information extracting·transforming interface program 12A, it is analyzed by the data returned from the extent information extracting·transforming interface program 12A whether the data is the data mixed with the control data or data composed of only user data. This is analyzed by determining whether correct data are read or not into the user buffer 51 in a request of read file operation to the user buffer 51 by using the API provided from the OS 13A (that is whether the read data is not intercepted by the extent information extracting·transforming program 14A or intercepted).

When correct data are read into the user buffer 51, this is the data read through the internal buffer (buffer 52 of OS) read by the OS, the data is that which the control data is added. Because the address of the buffer 52 of the OS is different from the address specified in the START EXTENT EXTRACTING, the access request directing the buffer 52 of OS is not intercepted by the extent information extracting·transforming program 14A.

When correct data are read into the user buffer 51, it is sent to the data exchange orogram 10B over the network by the data exchange program 10A. On the other hand, in a case of the access request to the device driver of the OS 13A for the user buffer 51, as the request is intercepted because the extent information extracting·transforming program 14A by START INTERCEPT request which is accompanied by START EXTENT EXTRACTING request made in advance, the real data reading is not performed. Accordingly investigating the buffer address returned by a request of obtaining extracted extent information, the distinction of a case shown in FIG. 11(A) and a case in figure (C) can be implemented.

The distinction process is the same in the case of the data exchanging program 11B coping with data in the disk drive 2 based on the extent information. If based on the information received from the OS 13A, data, which was read correctly into the user buffer 51 and transferred to data exchange program 11B, exists, it is written on file FB using API of OS 13B, the file data is written in the form neglecting the control data added by the OS 13A, (in this time, if necessary control data of the computer 1B is added). For the file region having the extent information sent by data exchanging program 11A, the file transmission is realized by a direct access to the disk drive 2.

In the file access, the file system is capable of the process based on the extent information and data received from the data exchanging program of the other side.

Figure 13:
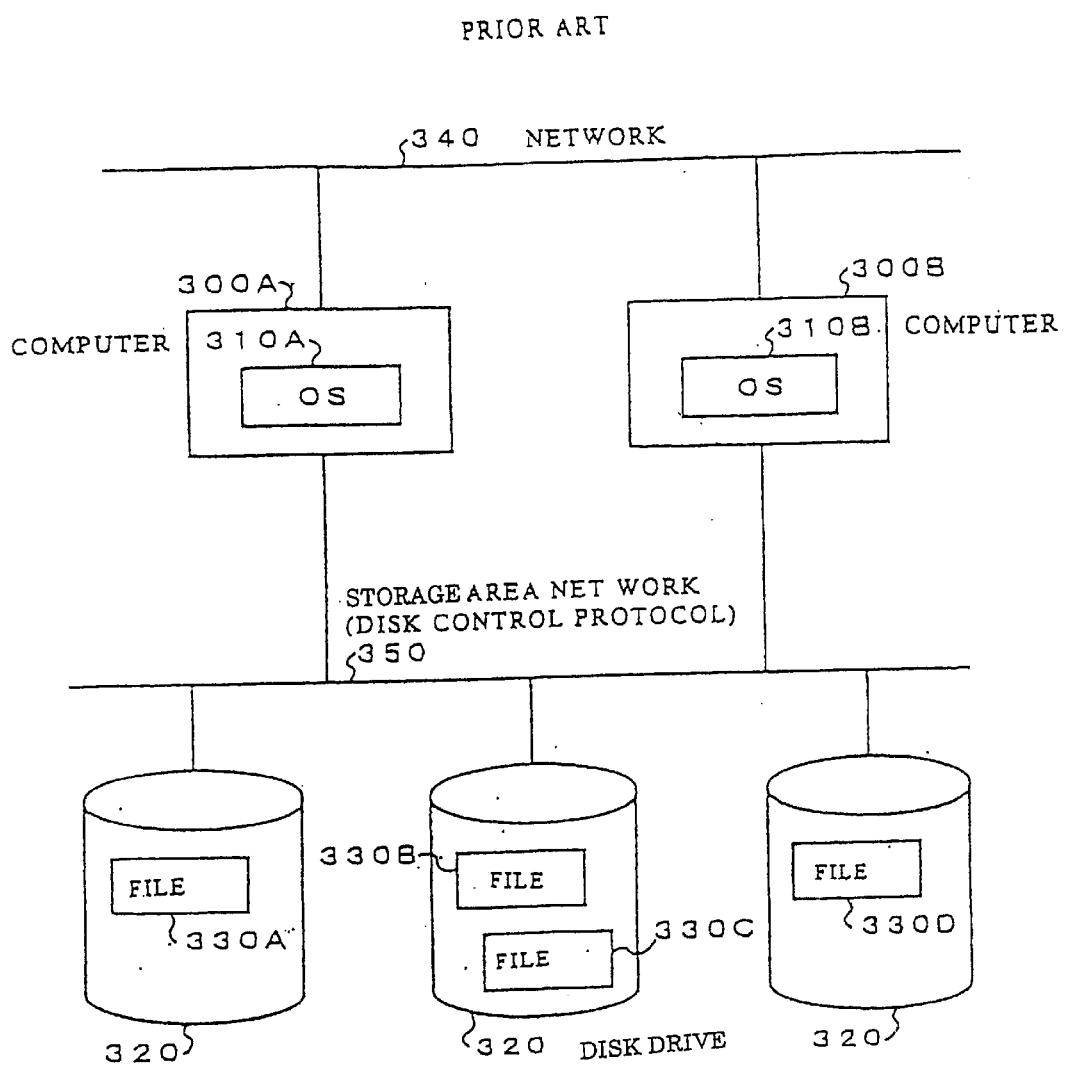
FIG. 13 shows an example of prior art which plural computers share a disk drive.

As a system component which allows the computer 1A and computer 1B to access directly to the disk drive 2, for example, a well-known storage area network like explained in FIG. 13 is used while only one disk drive 2 is shown in FIG. 1, plural devices are allowable.

In a case of a file exchange, the restriction is removed by forwarding the access request to another node through the device driver over network for this access.

Like explained above, files are exchanged or shared fast between OS of different computers by the present invention, even if the method of data layout on a disk is unknown for an OS. Especially, as the fast data exchange is realized without great modifications of principal parts of an existing OS, even if many different type OS exist, the process is implemented easily in each system.

The many features and advantages of the invention are apparent from the detailed specification and, thus, the appended claims are intended to cover all such features and advantages of the invention which fall within the true spirit and scope of the invention. Further, since numerous modifications and changes will readily occur to those skilled in the art, it is not intended that the invention is limited to the exact construction and operation illustrated and described, and accordingly all suitable modifications and equivalents may be resorted to, so long as they fall within the scope of the invention.

What is claimed is:

1. A fast data exchanging system between a first computer and a second computer of which the operating systems and the data layout method on an external storing device for each file are different from each other, and a file created by the operating system of the first computer is sent from the first computer to the second computer, comprising:

means for extracting extent information showing file location information on the external storing device by accessing directly the external storing device without depending the operating system;

means for analyzing input-output request from the operating system and accessing the external storing device with program to implement input or output of the external storing device based on the file location information;

means for requesting to another computer an extent information managed by an operating system of the another computer and receiving the extent information;

wherein the second computer requests from the first computer the extent information of a first file of the first computer, the first computer extracts the extent information and sends the extent information to the second computer, and further the second computer makes a second file of the same size as the first file on the external storing device based on the extent information, and with the second computer accessing the external storing device, the file data of the first file is copied to the second file directly on the external storing device.

2. A fast data exchanging system between plural computers of which operating systems are different from each other, including the data layout method on an external storing device being different or unknown, and which share files managed by the operating systems comprising:

means for extracting extent information showing file location information on the external storing device by analyzing input-output requests from the operating system to the external storing device without depending upon the operation systems;

means for analyzing the input-output request from the operating system and accessing the external storing device with a program to implement input or output of the external storing device based on the file location information;

means for requesting an extent information managed by an operating system of another computer and receiving the extent information;

wherein a first computer requests from a second computer the extent information of a file of the second computer, the second computer extracts the extent information and sends the extent information to the first computer, and the second computer accesses directly the file of the second computer thereafter, using the extent information.

3. A fast data exchanging system between plural computers of which operating systems are different, including the data layout method on an external storing device being different or unknown, and which share files managed by the operating systems comprising:

means for extracting extent information showing file location information on the external storing device by analyzing input-output requests from the operating system to the external storing device without depending upon the operating systems;

means for analyzing the input-output request from the operating system and accessing the external storing device with a program to implement input or output of the external storing device based on the file location information;

means for requesting an extent information managed by an operating system of another computer and receiving the extent information;

wherein a second computer requests from a first computer first extent information of a first file of the first computer, the first computer sends the first extent information to the second computer, the second computer makes a dummy file of the same size as the first file based on the first extent information in the external storing device, and further the second computer extracts second extent information of a dummy file and makes a transformation table between the first extent information and the second extent information; and further the first computer accesses the second file with the transformation table, when the first computer accessing the dummy file.

4. A medium storing a program realizing a fast data exchanging system between different type computers which are capable of sharing, transmitting or exchanging files managed by an operating system between different operating systems, the program comprising:

a program as a data exchanging program for sharing, transmitting and exchanging a file, and as an application program for an interface of a device driver implementing an access to the external storing device, when the interface program receiving a request of start of extent information extracting from said data exchanging program, the interface program sending a request of start of intercepting for the device driver, and gaining the extent information from the device driver to return the extent information to the request origin; and when the interface program receiving the request of start of extent information transformation from the data exchanging program, the interface program sending a pair of extent information of a file of a request origin and a target side to be transformed, and making the device driver to implement the access to the external storage device based on the transformed extent information.

5. A medium storing a program realizing a fast data exchanging system between different type computers, which are capable of sharing, transmitting or exchanging files managed by an operating system between different type operating systems, the program acting as a device driver implementing an access to an external storage device by an input and output request from an operating system, wherein the program comprising:

processing registering information regarding to a directed buffer area requested above based on a request of start of intercepting start, processing intercepting a request of input and output for the buffer area issued by the operating system and saving the extent information, processing returning the saved extent information in the directed buffer to a request origin for a request of gain extracted extent information, process registering a pair of information of the directed extent information for a request of start of extent information transforming, and implementing access to the external storing device based on the pair information of the extents, when accessing to the external storing device thereafter.

6. A fast data exchanging system between a first computer and a second computer of which the operating systems are different from each other, including the data layout method on an external storing device being different or unknown, and a file created by the operating system of the first computer is sent from the first computer to the second computer, comprising:

a unit extracting extent information showing file location information on the external storing device by analyzing input-output requests from the operating system to the external storage without depending upon the operating system;

a unit analyzing input-output request from the operating system and accessing the external storing device with a program to implement input or output of the external storing device based on the file location information;

a unit requesting to another computer an extent information managed by an operating system of another computer and receiving the extent information;

wherein the second computer requests to the first computer the first extent information of a first file of the first computer, the first computer extracts the first extent information and sends the first extent information to the second computer, and further the second computer makes a second file of the same size as the first file on the external storing device based on the first extent information, and with the second computer accessing the external storing device, the file data of the first file is copied to the second file directly on the external storing device.

7. A fast data exchanging system between plural computers of which operating systems are different from each other, including the data layout method on an external storing device being different or unknown, and which share files managed by the operating systems, comprising:

means for extracting extent information showing file location information on the external storing device by accessing directly the external storage device without depending upon the operation systems;

a unit analyzing the input-output request from the operating system and extracting a file location information;

a unit analyzing the input-output request from the operating system and accessing the external storing device with a program to implement input or output of the external storing device based on the file location information;

a unit requesting an extent information managed by an operating system of another computer and receiving the extent information;

wherein a first computer requests of a second computer the second extent information of a second file of the second computer, the second computer extracts the second extent information and sends the second extent information to the first computer, and the second computer accesses directly the second file thereafter, using the second extent information.

8. A fast data exchanging system between plural computers of which operating systems are different, including the data layout method on an external storing device being different or unknown, and which share files managed by the operating systems comprising:

a unit extracting extent information showing file location information on the external storing device by accessing directly the external storage device without depending upon the operating systems;

a unit analyzing the input-output request from the operating system and extracting a file location information;

a unit analyzing the input-output request from the operating system and accessing the external storing device with a program to implement input or output of the external storing device based on the file location information;

a unit requesting an extent information managed by an operating system of another computer and receiving the extent information;

wherein a second computer requests of a first computer the first extent information to the second computer, the second computer makes a dummy file of the same size as the first file based on the first extent information in the external storing device and further the second computer extracts the second extent information of a dummy file and makes a transformation table between the first extent information and the second extent information; and further the first computer accesses the second file with the transformation table, when the first computer accessing the dummy file.

* * * * *